United States Patent
Choi

(10) Patent No.: US 10,487,754 B1
(45) Date of Patent: Nov. 26, 2019

(54) VARIABLE-COMPRESSION-RATIO ENGINE

(71) Applicants: Hyundai Motor Company, Seoul (KR); Kia Motors Corp., Seoul (KR)

(72) Inventor: Myung Sik Choi, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 16/054,683

(22) Filed: Aug. 3, 2018

(30) Foreign Application Priority Data

May 2, 2018 (KR) ........................ 10-2018-0052455

(51) Int. Cl.
| | |
|---|---|
| *F02D 15/02* | (2006.01) |
| *F02B 75/04* | (2006.01) |
| *F01M 1/06* | (2006.01) |
| *F01B 31/14* | (2006.01) |
| *F16J 1/16* | (2006.01) |

(52) U.S. Cl.
CPC ................ *F02D 15/02* (2013.01); *F01M 1/06* (2013.01); *F02B 75/04* (2013.01); *F16J 1/16* (2013.01); *F01M 2001/066* (2013.01)

(58) Field of Classification Search
CPC .......... F02D 15/02; F02D 15/00; F02B 75/04; F02B 75/045; F01M 1/06; F01M 2001/066; F16J 1/16; F16J 1/14; F01B 31/14
See application file for complete search history.

(56) References Cited

U.S. PATENT DOCUMENTS

| | | | | |
|---|---|---|---|---|
| 4,830,517 | A * | 5/1989 | Naruoka | F02B 75/045 123/48 R |
| 7,533,638 | B1 * | 5/2009 | Berger | F02B 75/045 123/48 B |
| 8,393,307 | B2 * | 3/2013 | Lee | F02B 75/044 123/48 B |
| 9,309,831 | B2 * | 4/2016 | Nowak | F02B 75/044 |
| 9,784,305 | B2 * | 10/2017 | Wittek | F16C 7/06 |
| 10,087,830 | B2 * | 10/2018 | Paul | F02B 75/045 |
| 2015/0040870 | A1 * | 2/2015 | Nowak | F02B 75/045 123/48 B |
| 2017/0268419 | A1 * | 9/2017 | Kim | F02B 75/04 |
| 2018/0179949 | A1 * | 6/2018 | Diehm | F16C 7/06 |
| 2018/0328275 | A1 * | 11/2018 | Schaffrath | F16C 7/06 |

FOREIGN PATENT DOCUMENTS

KR   10-2011-0037394 A   4/2011

* cited by examiner

*Primary Examiner* — Grant Moubry
(74) *Attorney, Agent, or Firm* — Morgan, Lewis & Bockius LLP

(57) ABSTRACT

A variable-compression-ratio engine may include a piston pin configured to interconnect a piston and an end portion of a connecting rod; an eccentric cam rotatably provided around the end portion of the connecting rod so that the piston pin is provided eccentrically to the eccentric cam, the eccentric cam serving to eccentrically rotate the piston pin via rotation thereof to vary a height of a top dead point of the piston; a latching plate configured to eject an oil, supplied thereinto, outwards in a circumferential direction through an oil ejection hole formed in an external peripheral surface thereof, to be rotated by an ejection pressure of the oil, the latching plate being rotated with the eccentric cam; and an oil supply device configured to selectively supply the oil into the latching plate.

12 Claims, 17 Drawing Sheets

LOW COMPRESSION RATIO

HIGH COMPRESSION RATIO

LOW COMPRESSION RATIO

HIGH COMPRESSION RATIO

VARIABLE-COMPRESSION-RATIO ENGINE

CROSS-REFERENCE TO RELATED APPLICATION

The present application claims priority to Korean Patent Application No. 10-2018-0050455, filed on May 2, 2018 in the Korean Intellectual Property Office, the entire contents of which is incorporated herein for all purposes by this reference.

BACKGROUND OF THE INVENTION

Field of the Invention

The present invention relates to a variable-compression-ratio engine in which the rotational structure of an eccentric cam for eccentric rotation of a piston pin is simplified to simplify a variable-compression-ratio mechanism and reduce device design costs.

Description of Related Art

An engine, provided with a variable-compression-ratio (VCR) device, is adapted to vary the compression ratio of mixed air according to the driving state of a vehicle.

The engine raises the compression ratio of mixed air to reduce fuel consumption in a low-load driving state of the engine, such as high-speed traveling, and lowers the compression ratio of mixed air to increase the boost pressure of a turbo charger in a high-load driving state, such as when accelerating, preventing knocking while achieving an increase in fuel efficiency and engine output.

In the related art of the variable-compression-ratio device, there is a method of realizing a variable compression ratio by inducing partial deformation of a piston or by changing the volume of a combustion chamber via linkage.

The variable-compression-ratio device described above, however, requires an excessive change in design to widen the range of the variable compression ratio, and has a complicated mechanism for realizing the variable compression ratio.

Therefore, a variable-compression-ratio device having a relatively simplified structure, in which a piston pin is eccentrically rotated by the pressure of oil so that the height of a piston varies, has been provided.

The information included in this Background of the Invention section is only for enhancement of understanding of the general background of the invention and may not be taken as an acknowledgement or any form of suggestion that this information forms the prior art already known to a person skilled in the art

BRIEF SUMMARY

Various aspects of the present invention are directed to providing a variable-compression-ratio engine in which the rotational structure of an eccentric cam for eccentric rotation of a piston pin is simplified to simplify a variable-compression-ratio mechanism and reduce device design costs.

In accordance with an aspect of the present invention, the above and other objects may be accomplished by the provision of a variable-compression-ratio engine including a piston pin configured to interconnect a piston and an end portion of a connecting rod, an eccentric cam rotatably provided around the end portion of the connecting rod so that the piston pin is provided eccentrically to the eccentric cam, the eccentric cam serving to eccentrically rotate the piston pin via rotation thereof to vary a height of a top dead point of the piston, a latching plate configured to eject an oil, supplied thereinto, outwards in a circumferential direction through an oil ejection hole formed in an external peripheral surface thereof, to be rotated by an ejection pressure of the oil, the latching plate being rotated with the eccentric cam, and an oil supply device configured to selectively supply the oil into the latching plate.

The latching plate may include an oil inlet formed in one surface thereof so that the oil supplied through the oil supply device is introduced into the latching plate and an oil ejection passage formed therein to communicate with the oil inlet, the oil ejection passage may be connected to the oil ejection hole, which is formed in the external peripheral surface of the latching plate, so that the oil is ejected through the oil ejection hole, and the oil ejection hole may be formed in the external peripheral surface of the latching plate to open obliquely in the circumferential direction thereof.

The oil ejection passage may include a first ejection passage formed in the latching plate in the circumferential direction about the piston pin, a second ejection passage having one end portion configured to communicate with the first ejection passage and a remaining end portion formed in a radial direction of the latching plate, and a third ejection passage having one end portion configured to be bent to communicate with the remaining end portion of the second ejection passage and a remaining end portion connected to the oil ejection hole.

The third ejection passage may be bent relative to the second ejection passage at an angle of 90° or more and less than 180°.

The oil supply device may include an oil line formed in a longitudinal direction of the connecting rod so that the oil is supplied thereto, a latching mechanism configured to switch the latching plate between a rotation state and a rotation-restricted state using a pressure of the oil introduced through the oil line, an oil transfer passage formed in a circumferential direction of the eccentric cam so that the oil, having passed through the latching mechanism, is supplied into the eccentric cam through the oil transfer passage, and an oil outlet formed in the eccentric cam to communicate with an oil inlet in the latching plate so that the oil inside the oil transfer passage is introduced into the latching plate through the oil outlet.

The connecting rod may include a cam hole formed in the end portion thereof so that the eccentric cam is inserted into the cam hole, and an oil hole formed between the latching mechanism and an internal peripheral surface of the cam hole so that the oil, having passed through the latching mechanism, flows through the oil hole, the oil transfer passage may be divided into a first transfer passage and a second transfer passage, the first transfer passage may be formed in the circumferential direction of the eccentric cam to remain in communication with the oil hole, which is connected to the cam hole, and the second transfer passage may communicate with an end portion of the first transfer passage, and may also communicate with the oil inlet in the latching plate.

The latching mechanism may include a latching recess formed in one surface of the latching plate that faces the end portion of the connecting rod, the latching plate being coupled to either side of the eccentric cam, a latching cylinder formed in the end portion of the connecting rod and having an end portion located to match the latching recess during rotation of the latching plate, the latching cylinder being connected to an upper end portion of the oil line so that the oil is supplied into the latching cylinder, an oil groove formed in the upper end portion of the oil line to extend toward the latching recess and positioned to communicate with the latching recess during rotation of the latching plate, a latching pin provided in the latching cylinder to be rectilinearly movable toward the latching plate so that either end portion of the latching pin is fitted into the latching recess to implement a latching operation, an oil passage hole formed in the latching pin at a medium-height position so that the oil supplied through the oil line passes through the oil passage hole during an unlatching operation period during which the latching pin is not caught by the latching recess, and an oil hole formed between the latching cylinder and the oil transfer passage of the eccentric cam to supply the oil, having passed through the oil passage hole, to the oil transfer passage.

The oil line may be connected to only one side of the latching cylinder, and the latching mechanism may further include a latching spring configured to provide an elastic force that continuously pushes the latching pin to the side of the latching cylinder.

The latching pin may include a first stepped portion formed at a medium-height position thereof to provide one end portion and a remaining end portion of the latching pin with different external diameters, the latching cylinder may include a second stepped portion formed at a medium-height position thereof to provide one end portion and a remaining end portion of the latching cylinder with different internal diameters, and the latching spring may be supported between the first stepped portion and the second stepped portion.

The oil line may be connected to either side of the latching cylinder, and the oil may be supplied to the oil line via an electric oil pump.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
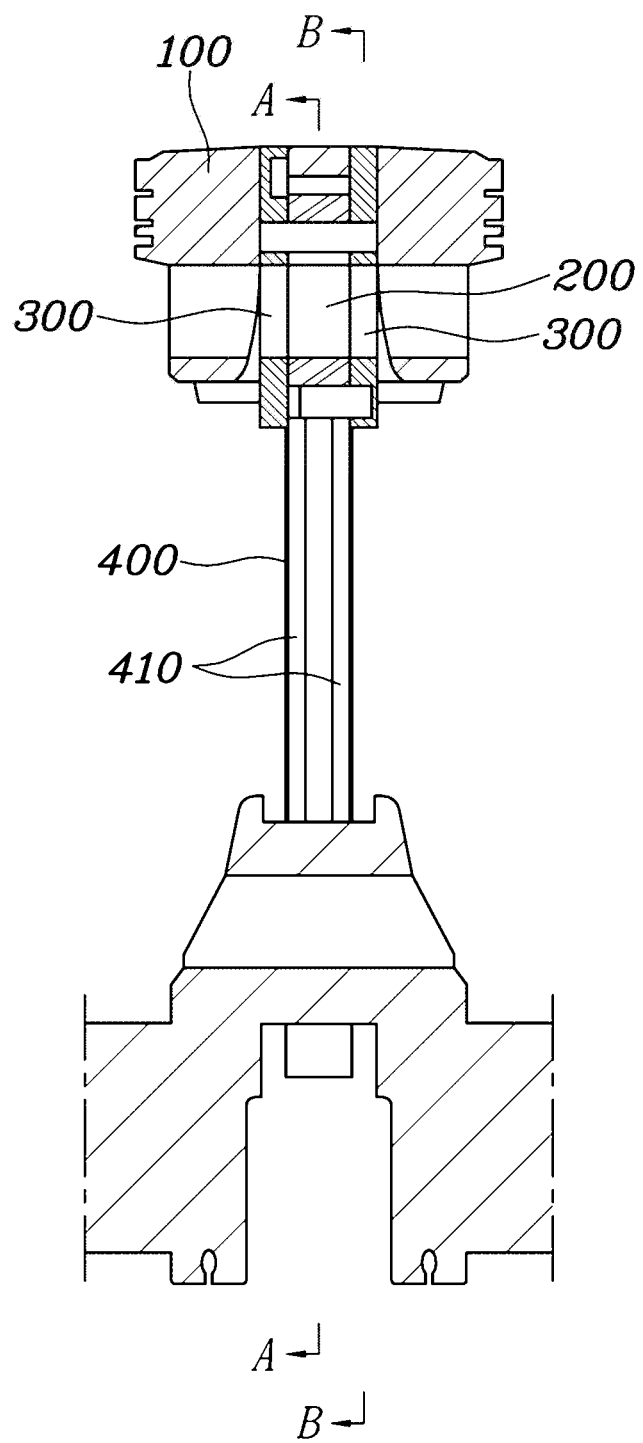
FIG. 1 is a cross-sectional view illustrating the structure in which a variable-compression-ratio device is provided to a connecting rod and a piston according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

A variable-compression-ratio engine of the present invention may include a piston pin 110, an eccentric cam 200, latching plates 300, and an oil supply device.

Figure 2:
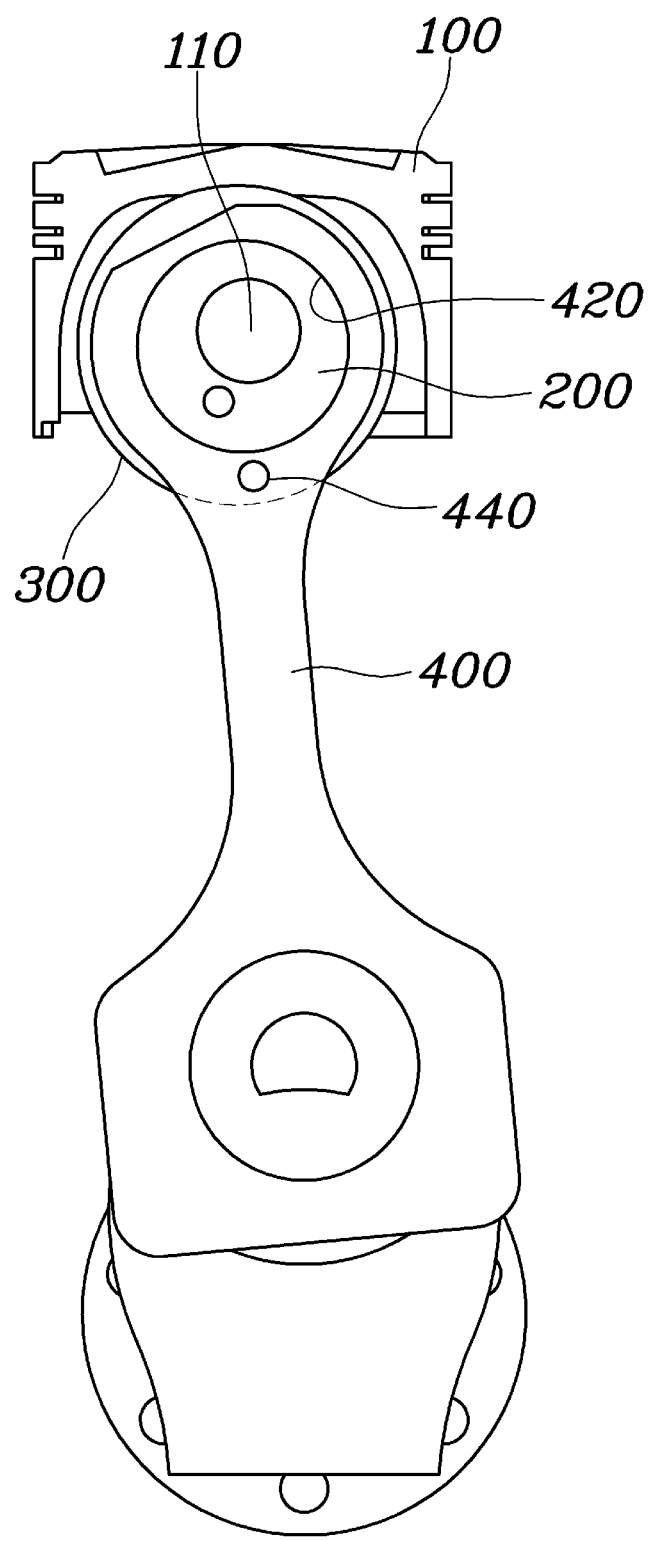
FIG. 2 is a cross-sectional view taken along line A-A of FIG. 1.
Figure 3:
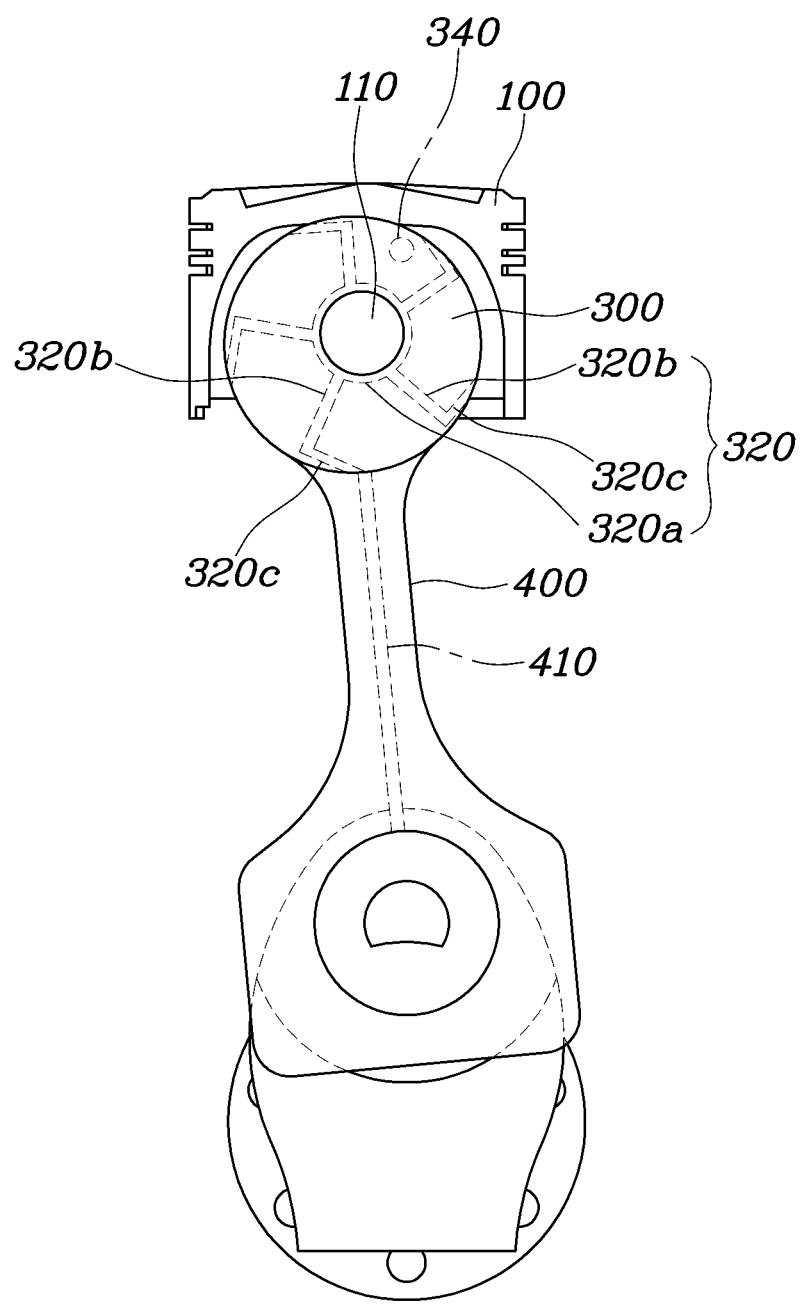
FIG. 3 is a cross-sectional view taken along line B-B of FIG. 1, illustrating an example of a latching plate.
Figure 4A:
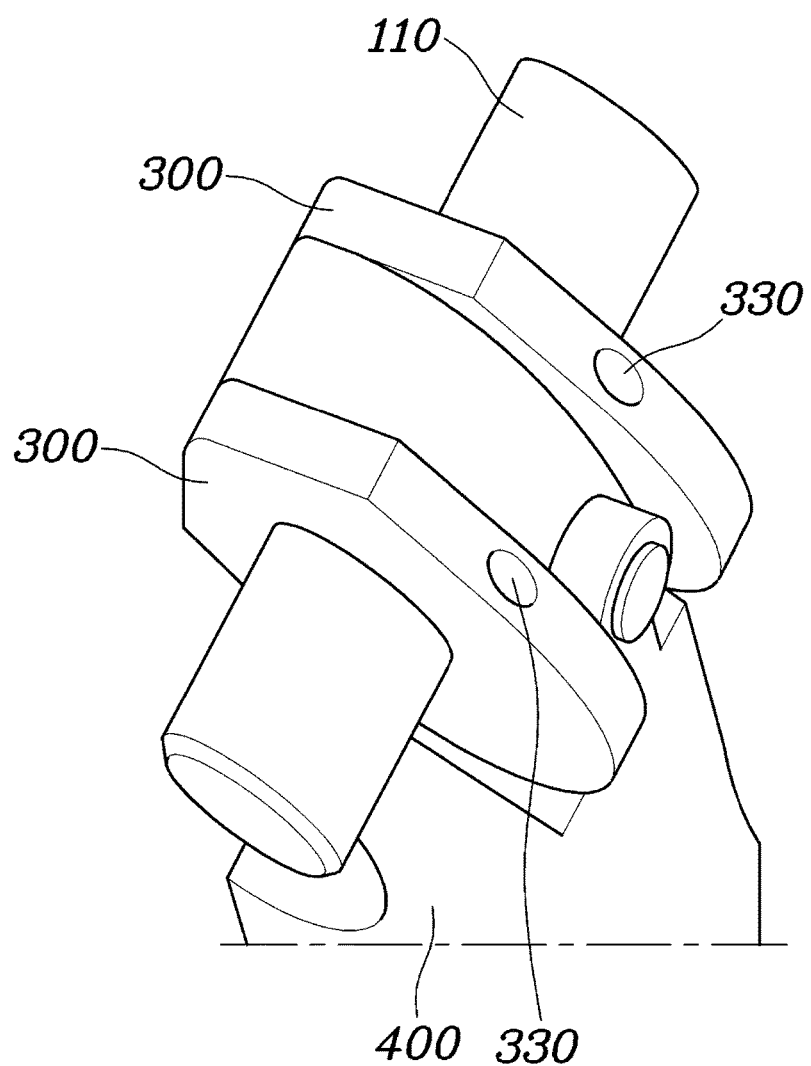
FIG. 4A, FIG. 4B, and FIG. 4C are views illustrating a shape that exemplifies another structure of the latching plate and the path, along which oil moves in the latching plate through an oil ejection passage.
Figure 4B:
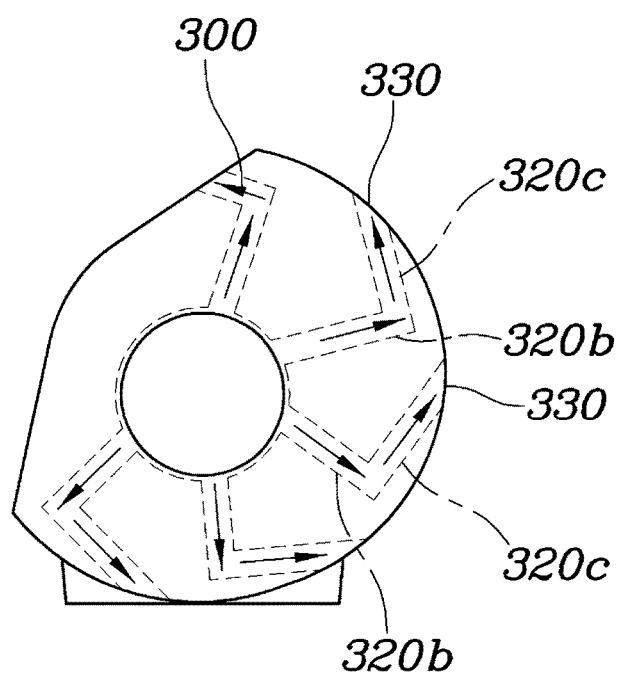
Figure 4C:
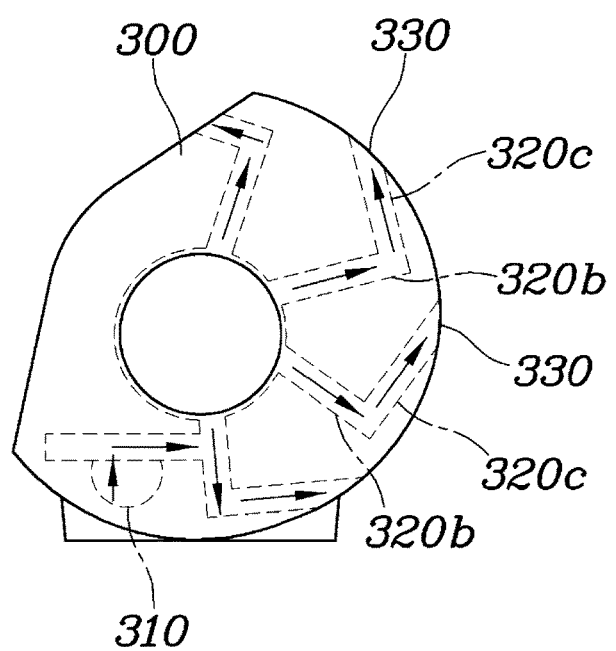

Considering the present invention in detail with reference to FIG. 1, FIG. 2, and FIG. 3, first, the piston pin 110 is provided to interconnect a piston 100 and an upper end portion of a connecting rod 400. The piston pin 110 is configured to eccentrically rotate about the axis of the eccentric cam 200 when the eccentric cam 200 rotates.

The eccentric cam 200 is rotatably provided around the upper end portion of the connecting rod 400, and the piston pin 110 is located at an eccentric position about the axis of the eccentric cam 200. Accordingly, the eccentric cam 200 is configured to eccentrically rotate the piston pin 110 via rotation thereof to vary the height of the top dead point of the piston 100.

The latching plates 300 are coupled respectively to opposite sides of the eccentric cam 200 to rotate together with the eccentric cam 200. Each latching plate 300 is configured to eject the oil, supplied thereinto, outwards in a circumferential direction through an oil ejection hole 330, which is formed in the external peripheral surface thereof. The latching plate 300 is rotated by the pressure of the oil ejected through the oil ejection hole 330.

The oil supply device is configured to selectively supply the oil into the latching plate 300. By supplying the oil into the latching plate 300 in a driving situation in which variation in the compression ratio is required, it is possible to vary the height of the piston 100, which enables variation in the compression ratio.

Specifically, when variation in the compression ratio is required to suit the driving state of a vehicle, oil is supplied into the latching plate 300 by the oil supply device, so that the oil supplied into the latching plate 300 is ejected through the oil ejection hole 330 formed in the external peripheral surface of the latching plate 300.

At the present time, the oil is ejected through the oil ejection hole 330 in the circumferential direction (e.g., the counterclockwise direction) opposite to the direction (e.g., the clockwise direction) in which the latching plate 300 needs to be rotated, whereby the force counteracting the oil ejection force is generated so that the latching plate 300 may be rotated in the direction (the clockwise direction) in which the counteractive force is generated.

Accordingly, when the eccentric cam 200 coupled to the latching plate 300 rotates together with the latching plate 300, the piston pin 110, which is provided eccentrically to the eccentric cam 200, is eccentrically rotated about the axis of the eccentric cam 200. Accordingly, the piston 100 moves together along the eccentric rotation trace of the piston pin 110.

As a result, the height of the piston 100 varies, and in turn, the height of the top dead point of the piston 100 varies, which enables variation in the compression ratio.

In an exemplary embodiment of the present invention, the oil supplied through the oil supply device is used to rotate the latching plate 300.

Considering the structure in which the oil is supplied into and ejected from the latching plate 300 with reference to FIG. 4A, FIG. 4B, and FIG. 4C and FIG. 5, the latching plate 300 has an oil inlet 310 formed in one surface thereof that faces the eccentric cam 200, so that the oil supplied through the oil supply device is introduced into the latching plate 300 through the oil inlet 310.

Furthermore, the latching plate 300 may include an oil ejection passage 320 formed therein to communicate with the oil inlet 310. The oil ejection passage 320 is connected to the oil ejection hole 330, which is formed in the external peripheral surface of the latching plate 300, so that the oil is ejected through the oil ejection hole 330.

The oil ejection hole 330 is formed in the external peripheral surface of the latching plate 300 to open obliquely in the circumferential direction thereof with a predetermined angle with respect to a radial direction of the latching plate 300. Accordingly, when the oil is ejected in the direction in which the oil ejection hole 330 opens, the force counteracting the oil ejection force provides torque to the latching plate 300, facilitating the latching plate 300 to be rotated in the direction opposite to the direction in which the oil is ejected.

The oil ejection passage 320 may be divided into a first ejection passage 320a, a second ejection passage 320b, and a third ejection passage 320c. Here, the second ejection passage 320b and the third ejection passage 320c may be radially formed throughout the circumferential direction of the latching plate 300, as illustrated in FIG. 3, or may be formed in a portion of the circumferential direction of the latching plate 300, as illustrated in FIG. 4A, FIG. 4B, and FIG. 4C and FIG. 5.

Considering the configuration of the first, second, and third ejection passages in greater detail with reference to the accompanying drawings, first, the first ejection passage 320a is formed in the circumferential direction about a hole inside the latching plate 300, into which the piston pin 110 is fitted.

As such, the second ejection passage 320b is configured such that one end portion thereof communicates with the first ejection passage 320a and the other end portion thereof is formed in the radial direction of the latching plate 300. A distal portion of the second ejection passage 320b at the other end portion thereof is blocked.

Furthermore, the third ejection passage 320c is configured such that one end portion thereof is bent to communicate with the other end portion of the second ejection passage 320b and the other end portion thereof is connected to the oil ejection hole 330.

That is, when the oil, introduced into the latching plate 300 through the oil inlet 310, is introduced into the first ejection passage 320a, the oil is branched to each second ejection passage 320b that communicates with the first ejection passage 320a, and then the oil introduced into the second ejection passage 320b moves to the third ejection passage 320c to be ejected through the oil ejection hole 330.

Here, the third ejection passage 320c is bent relative to the second ejection passage 320b at an angle of 90° or more and less than 180°.

For example, when the third ejection passage 320c is bent at an angle of 90° to be orthogonal to the second ejection passage 320b, the oil ejection hole 330 in the distal portion of the third ejection passage 320c may be formed in the external peripheral surface of the latching plate 300 to open obliquely.

In an exemplary embodiment of the present invention, as described above, the oil is supplied into and ejected from the latching plate 300. This supply of oil to the latching plate 300 may be realized by the oil supply device.

Considering the configuration of the oil supply device with reference to FIG. 4A, FIG. 4B, and FIG. 4C and FIG. 5, the connecting rod 400 may include an oil line 410 formed in the longitudinal direction thereof so that the oil is supplied from the lower end portion to the upper end portion of the connecting rod 400 through the oil line 410. Here, the lower end portion of the oil line 410 may be connected to an oil control valve, so that the oil is supplied to the oil line 410 via the oil control valve.

The connecting rod 400 is provided with a latching mechanism, which is configured to switch the latching plate 300 between a rotation state and a rotation-restricted state using the pressure of the oil introduced through the oil line 410.

Furthermore, the eccentric cam 200 may include an oil transfer passage 210 formed in the circumferential direction thereof so that the oil that has passed through the latching mechanism is supplied into the eccentric cam 200.

The eccentric cam 200 may further include oil outlets 220 formed in opposite sides thereof to be connected to the oil transfer passage 210. Each oil outlet 220 is formed to communicate with the oil inlet 310 in a corresponding one of the latching plates 300 so that the oil inside the oil transfer passage 210 is introduced into the latching plate 300.

That is, an oil path for the passage of oil is formed between the oil line 410 and the eccentric cam 200 and between the eccentric cam 200 and the latching plate 300, so that the oil supplied from the oil line 410 may be supplied into the latching plate 300 through the latching mechanism and the oil path formed in the eccentric cam 200.

Figure 5:
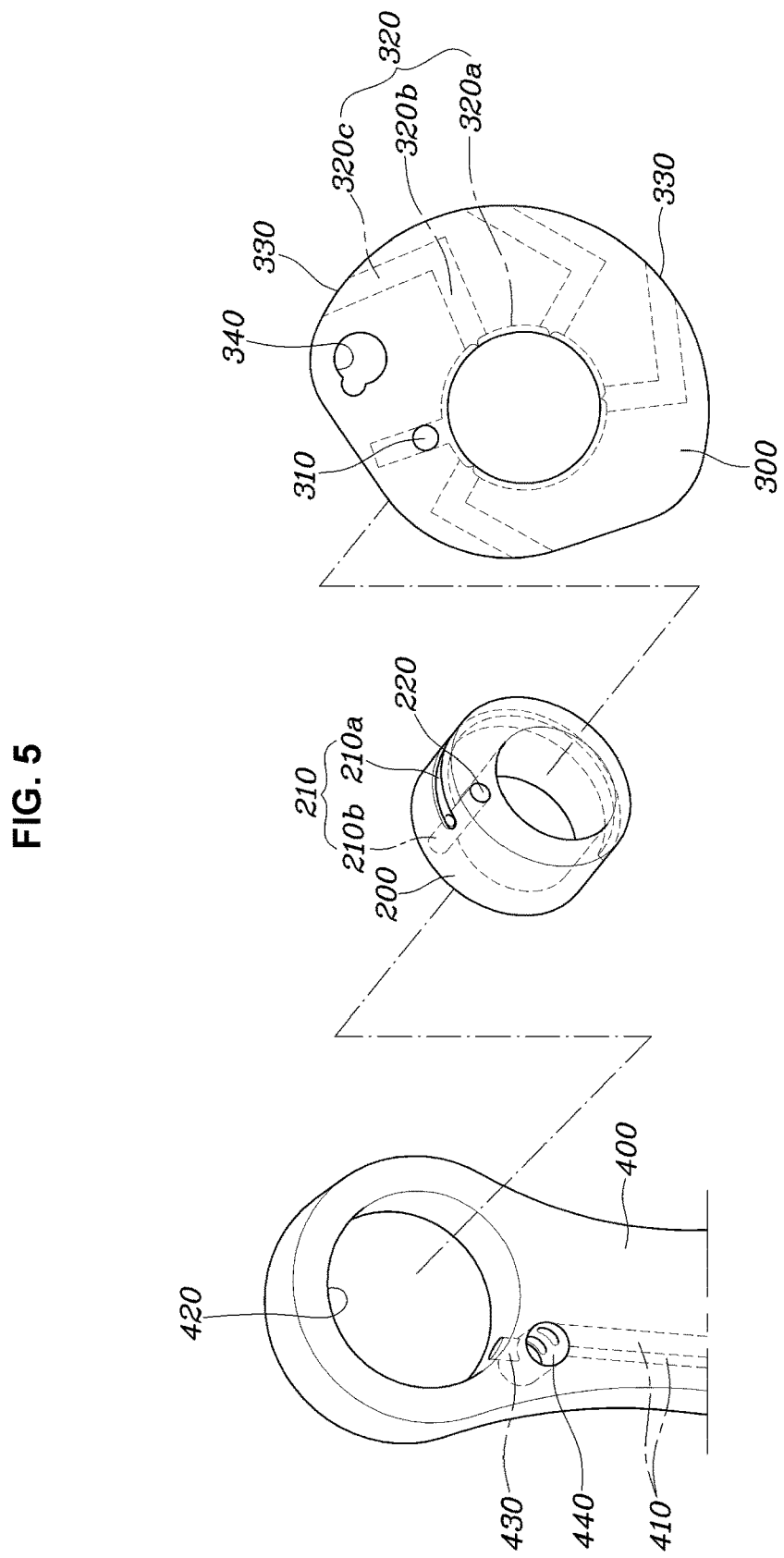
FIG. 5 is a view for explaining the structure by which oil supplied through an oil line is discharged to an oil ejection hole in the latching plate.

Now, the configuration of the oil path, through which the oil that has passed through the latching mechanism is supplied to the latching plate 300, will be described in more detail with reference to FIG. 5. The connecting rod 400 may include a circular cam hole 420 formed in the upper end portion thereof, so that the eccentric cam 200 is inserted into the cam hole 420.

Furthermore, the connecting rod 400 may include an oil hole 430 formed between the latching mechanism and the internal peripheral surface of the cam hole 420. Accordingly, the connecting rod 400 is configured such that the oil that has passed through the latching mechanism is introduced into the oil transfer passage 210, formed in the eccentric cam 200, through the oil hole 430.

Here, the oil transfer passage 210 may be divided into a first transfer passage 210*a* and a second transfer passage 210*b*. The first transfer passage 210*a* is formed in the circumferential direction of the eccentric cam 200 to remain in communication with the oil hole 430, which is connected to the cam hole 420.

The first transfer passage 210*a* is formed to have an arc shape to correspond to the position at which the oil hole 430 is connected to the cam hole 420. Accordingly, even if the eccentric cam 200 rotates, the oil hole 430 and the first transfer passage 210*a* may remain in communication with each other.

The second transfer passage 210*b* is formed at the end portion of the first transfer passage 210*a* to communicate with the first transfer passage 210*a*. The second transfer passage 210*b* branches in opposite directions toward the respective latching plates 300, so that opposite end portions of the second transfer passage 210*b* communicate with the oil inlets 310 formed in the respective latching plates 300.

That is, the oil that has passed through the latching mechanism and has been introduced into the oil hole 430 may be introduced into the second transfer passage 210*b* by way of the first transfer passage 210*a*, and in turn, the oil introduced into the second transfer passage 210*b* may be introduced into the oil ejection passage 320 in the latching plate 300 through the oil inlet 310 formed in the latching plate 300.

Meanwhile, in an exemplary embodiment of the present invention, the latching mechanism, which is operated by the pressure of oil, may realize an unlatching operation of rotating the latching plate 300 and a latching operation of restricting rotation of the latching plate 300.

Figure 6A:
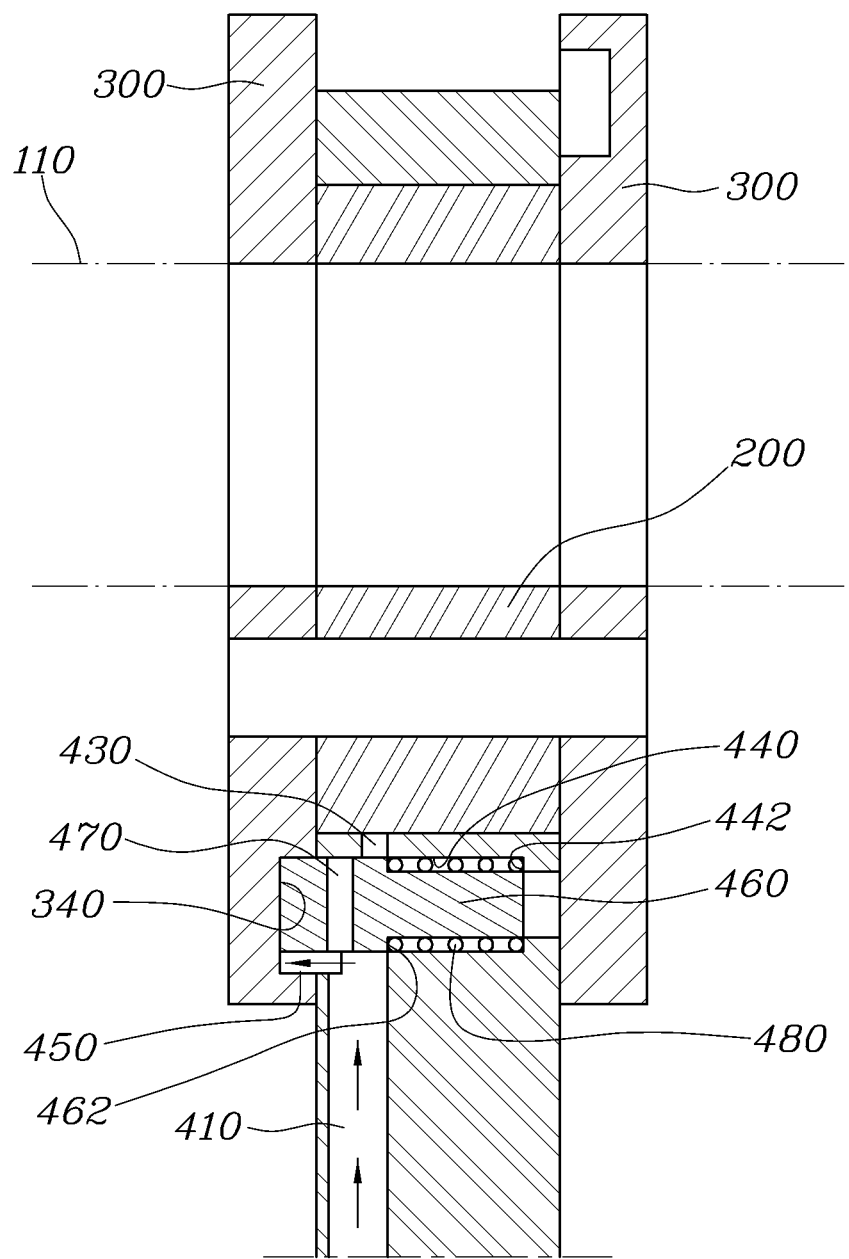
FIG. 6A, FIG. 6B, and FIG. 6C are views for explaining the configuration of various exemplary embodiments of a latching mechanism and the latching operation procedure thereof according to an exemplary embodiment of the present invention.
Figure 6B:
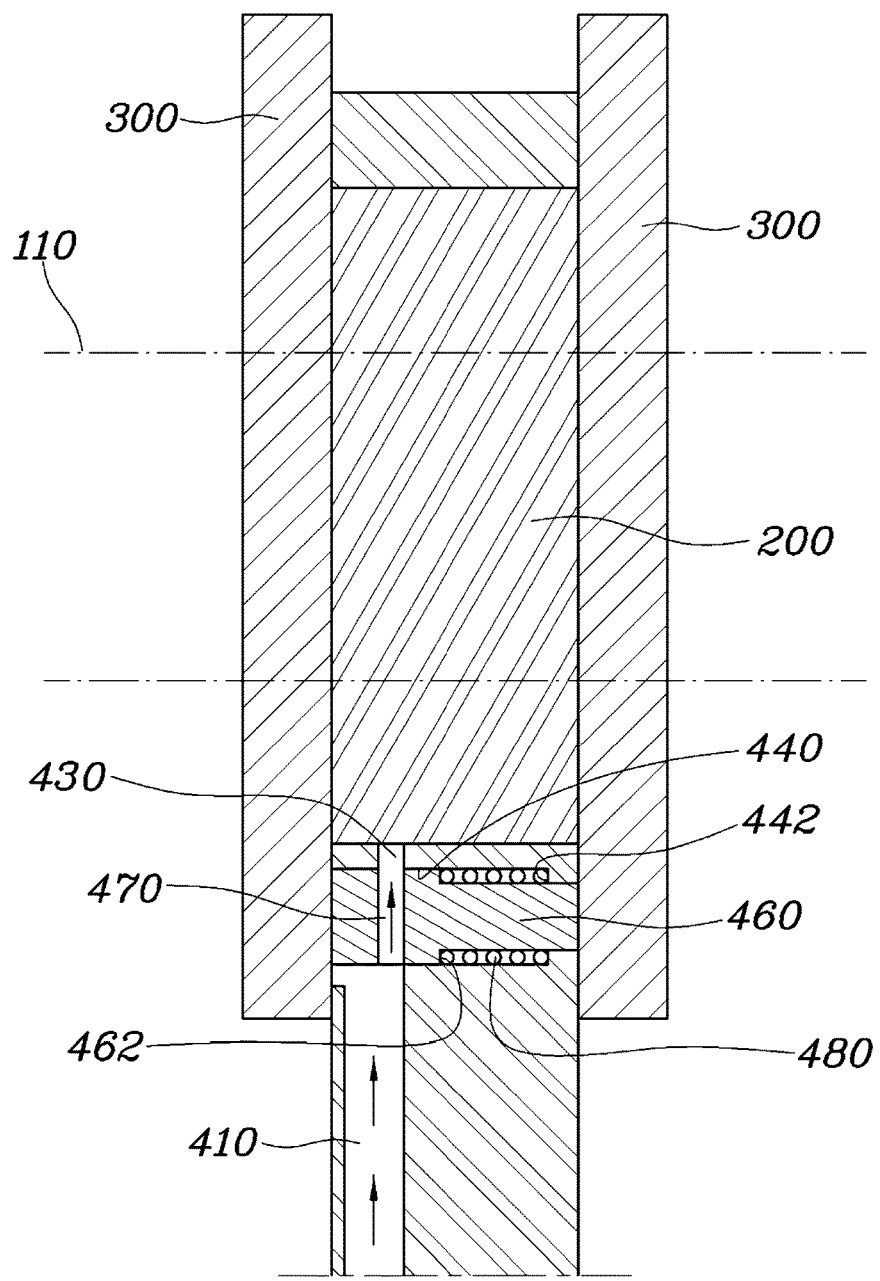
Figure 6C:
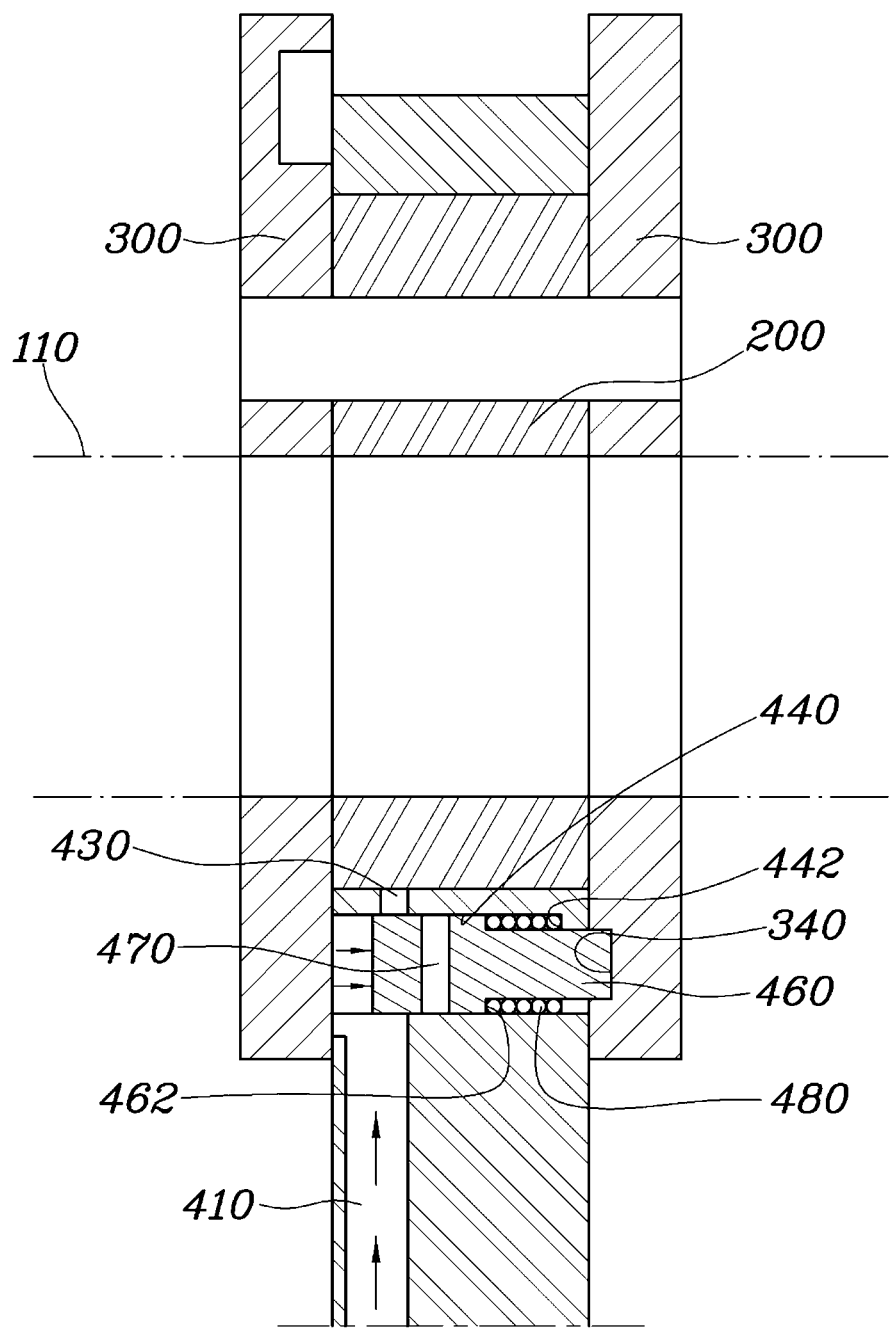

FIG. 6A, FIG. 6B, and FIG. 6C are views illustrating the configuration and the latching operation procedure of the latching mechanism according to various exemplary embodiments of the present invention, and FIG. 7A, FIG. 7B, FIG. 7C, FIG. 7D, and FIG. 7E are views illustrating the configuration and the latching operation procedure of the latching mechanism according to various exemplary embodiments.

Now, the latching mechanism will be described with reference to the drawings. Each of the latching plates 300, coupled to opposite sides of the eccentric cam 200, includes a latching recess 340 formed in the surface thereof that faces the end portion of the connecting rod 400.

Here, the latching recess 340 is formed so as not to overlap the oil ejection passage 320 formed in the latching plate 300. The latching recess 340 in one latching plate 300 and the latching recess 340 in the other latching plate 300 are formed at different rotational-displacement positions.

That is, the latching recess 340 in one latching plate 300 is formed to cause a latching pin 460, which will be described below, to be inserted thereinto in the state in which a low compression ratio is realized by downward rotation of the piston pin 110, and the latching recess 340 in the other latching plate 300 is formed to cause the latching pin 460 to be inserted thereinto in the state in which a high compression ratio is realized by upward rotation of the piston pin 110.

Furthermore, the connecting rod 400, which is located between the two latching plates 300, is formed with a latching cylinder 440 in the end portion thereof. The latching cylinder 440 is formed such that opposite end portions thereof face the respective latching plates 300. Accordingly, the opposite end portions of the latching cylinder 440 are respectively located to match the respective latching recesses 340 while the latching plates 300 rotate. Furthermore, the internal to the latching cylinder 440 is connected to the upper end portion of the oil line 410 so that the oil is supplied into the latching cylinder 440.

The oil line 410 is formed in the upper end portion thereof with an oil groove 450, through which the oil passes toward the latching recess 340. The oil groove 450 is positioned to communicate with the latching recess 340 while the latching plate 300 rotates.

The latching pin 460 is linearly movably provided in the latching cylinder 440 at a position between the two latching plates 300. Each end portion of the latching pin 460 may be fitted into a corresponding one of the latching recesses 340 to implement a latching operation.

Specifically, when the latching pin 460 is linearly moved to one side, the latching pin 460 may be inserted into the latching recess 340 formed in one latching plate 300 to implement a latching operation. When the latching pin 460 is linearly moved to the other side, the latching pin 460 may be inserted into the latching recess 340 formed in the other latching plate 300 to implement a latching operation. Needless to say, in the case in which the two latching recesses 340 do not match opposite end portions of the latching cylinder 440 while the latching plates 300 rotate, the latching pin 460 is not caught by any one of the latching recesses 340, and thus is in an unlatched state. In the instant state, both the latching plates 300 are rotatable.

The latching pin 460 has an oil passage hole 470 formed therein at a substantially medium-height position thereof so that the oil supplied through the oil line 410 passes through the oil passage hole 470 during an unlatching operation period during which the latching pin 460 is not caught by the latching recess 340.

Furthermore, the oil hole 430 is formed between the latching cylinder 440 and the oil transfer passage 210 in the eccentric cam 200 so that the oil that has passed through the oil passage hole 470 may be supplied to the oil transfer passage 210 through the oil hole 430.

That is, by controlling the behavior of the latching pin 460 using the pressure of the oil supplied into the latching cylinder 440, a latching operation, in which the latching pin 460 is inserted into the latching recess 340 in one latching plate 300 to limit the rotation of the latching plate 300 and the eccentric cam 200, is implemented. Needless to say, an unlatching operation, in which the latching pin 460 is released from the latching recess 340 in the latching plate 300 to permit the rotation of the latching plate 300 and the eccentric cam 200, may be implemented. Furthermore, after the unlatching operation, a latching operation, in which the latching pin 460 is inserted into the latching recess 340 in the other latching plate 300 to limit the rotation of the latching plate 300 and the eccentric cam 200, may be implemented.

In the present way, the piston pin 110 may be eccentrically rotated to vary the top dead point of the piston 100, which enables variation in the compression ratio.

FIG. 6A, FIG. 6B, and FIG. 6C illustrate the various exemplary embodiments of the latching mechanism. In the various exemplary embodiments of the present invention, the oil line 410 may be connected to only one side of the latching cylinder 440, and a latching spring 480 may be provided to apply elastic force that continuously pushes the latching pin 460 to one side thereof.

Furthermore, to provide one end portion and the other end portion of the latching pin 460 with different external diameters, the latching pin 460 is formed with a first stepped portion 462 at a substantially medium-height position thereof. To provide one end portion and the other end portion of the latching cylinder 440 with different internal diameters, the latching cylinder 440 is formed with a second stepped portion 442 at a substantially medium-height position thereof. The latching spring 480 may be supported between the first stepped portion 462 and the second stepped portion 442, and may provide an elastic force that continuously pushes the latching pin 460 towards one latching plate 300.

Next, the latching operation procedure using the latching mechanism will be described with reference to FIG. 6A, FIG. 6B, and FIG. 6C. Based on the driving state of the vehicle, it is necessary to switch the compression ratio of mixed air from a low compression ratio to a high compression ratio or from a high compression ratio to a low compression ratio. For example, the following description is made on the assumption that FIG. 6A illustrates the state in which a high compression ratio is realized.

When oil is supplied into the latching cylinder 440 through the oil line 410 in the state illustrated in FIG. 6A, the oil is introduced into the oil groove 450 formed in the upper end portion of the oil line 410 since the entrance of the oil hole 430 is blocked by the latching pin 460, applying force that pushes the latching pin 460 to the right side thereof.

Accordingly, the latching pin 460 is moved to the right side and is separated from the latching recess 340 in the left latching plate 300. Thus, the latching pin 460 no longer restrains the latching plate 300.

As a result, as illustrated in FIG. 6B, since the oil passage hole 470 formed in the latching pin 460 is changed to the state in which it communicates with the oil hole 430, the oil supplied to the latching cylinder 440 through the oil line 410 is introduced into the oil hole 430 through the oil passage hole 470. The oil introduced into the oil hole 430 passes through the oil transfer passage 210 formed in the eccentric cam 200, as illustrated in FIG. 5, being introduced into the oil ejection passage 320 in the latching plate 300. As such, when the oil introduced into the oil ejection passage 320 is ejected through the oil ejection hole 330, the latching plate 300 may be rotated by the ejection pressure of the oil.

When the latching recess 340 formed in the right latching plate 300 is moved to match the right end portion of the latching cylinder 440 while the latching plate 300 rotates, the force that pushes the latching pin 460 to the right side is applied by the pressure of oil supplied through the oil line 410. Accordingly, as illustrated in FIG. 6C, a latching operation in which the latching pin 460 is inserted into the latching recess 340 in the right latching plate 300 to limit the rotation of the latching plate 300 may be implemented.

Figure 8A:
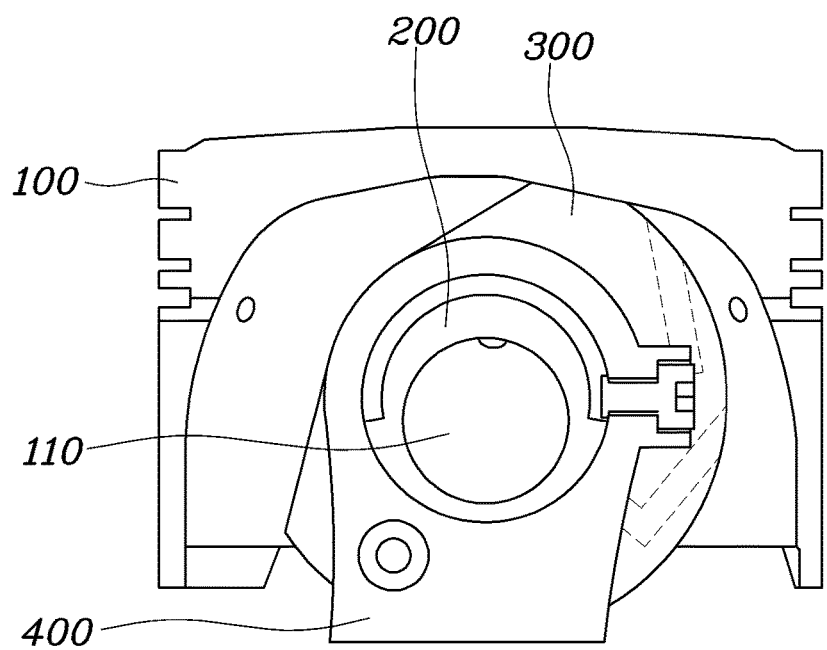
FIG. 8A and FIG. 8B are views respectively illustrating the state of realizing a low compression ratio and the state of realizing a high compression ratio via a variable-compression-ratio operation according to an exemplary embodiment of the present invention.

That is, FIG. 6C illustrates the state in which the piston pin 110 is eccentrically rotated by the rotation of the eccentric cam 200, which rotates together with the latching plate 300, so that the piston 100 is moved downwards together with the piston pin 110. Accordingly, the height of the top dead point of the piston 100 is lowered. In the instant state, the latching mechanism enables switching to the state in which a low compression ratio is realized, as illustrated in FIG. 8A.

In the case in which the latching mechanism is used to realize switching from a low compression ratio to a high compression ratio, such a compression-ratio-switching operation is possible by releasing the latching pin 460 from the right latching plate 300 and inserting the latching pin 460 into the left latching plate 300 using the elastic force of the latching spring 480.

That is, when the supply of oil through the oil line 410 stops, the pressure of oil that pushes the latching pin 460 to the right side is removed, whereby the latching pin 460 is separated from the latching recess 340 in the right latching plate 300 by the elastic force of the latching spring 480 and no longer restrains the latching plate 300.

Accordingly, the latching plate 300 is rotated by the behavior of the piston 100, and when the latching recess 340 formed in the left latching plate 300 is moved to match the left end portion of the latching cylinder 440 while the latching plate 300 rotates, the latching pin 460 is inserted into the latching recess 340 in the left latching plate 300 by the elastic force of the latching spring 480, implementing a latching operation to limit the rotation of the latching plate 300.

Figure 8B:
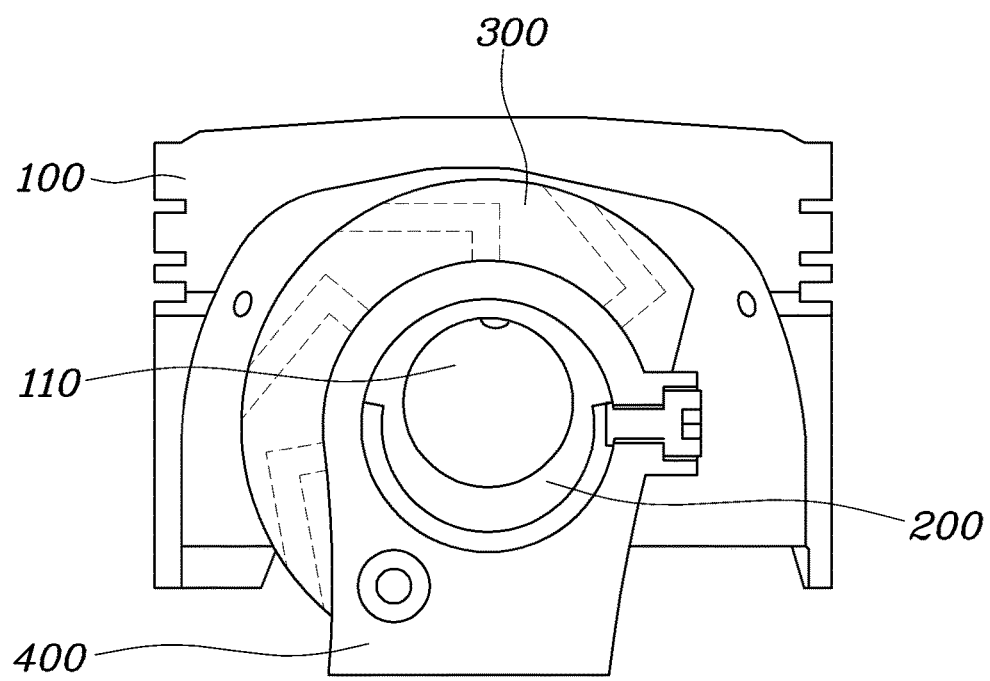

That is, as illustrated in FIG. 6, the piston pin 110 is eccentrically rotated by the rotation of the eccentric cam 200, which rotates together with the latching plate 300, so that the piston 100 is moved upwards together with the piston pin 110. Accordingly, the height of the top dead point of the piston 100 is raised. In the instant state, the latching mechanism enables switching to the state in which a high compression ratio is realized, as illustrated in FIG. 8B.

FIG. 7A, FIG. 7B, FIG. 7C, FIG. 7D, and FIG. 7E illustrate various exemplary embodiments of the latching mechanism in which two oil lines, i.e. A first oil line 410a and a second oil line 410b, may be respectively connected to opposite sides of the latching cylinder 440, and oil may be supplied to the first oil line 410a and the second oil line 410b by an electric oil pump 500.

In the various exemplary embodiments of the latching mechanism, the latching pin 460 may not remain in the latched state in the driving situation in which the pressure of the oil supplied from the first oil line 410a and the second oil line 410b is reduced. Therefore, the latching pin 460 may be controlled to be latched or to remain in the latched state by increasing the pressure of the oil supplied from the first oil line 410a or the second oil line 410b using the electric oil pump 500 with the ignition off or at the time of engine cranking.

As such, the latching operation procedure using the latching mechanism will be described with reference to FIGS. 7A to 7E. For example, when oil is supplied into the latching cylinder 440 through the first oil line 410a in the state illustrated in FIG. 7A in which a high compression ratio is realized, the oil is introduced into the oil groove 450 formed in the upper end portion of the first oil line 410a since the entrance of the oil hole 430 is blocked by the latching pin 460, applying force that pushes the latching pin 460 to the right side thereof.

Figure 7A:
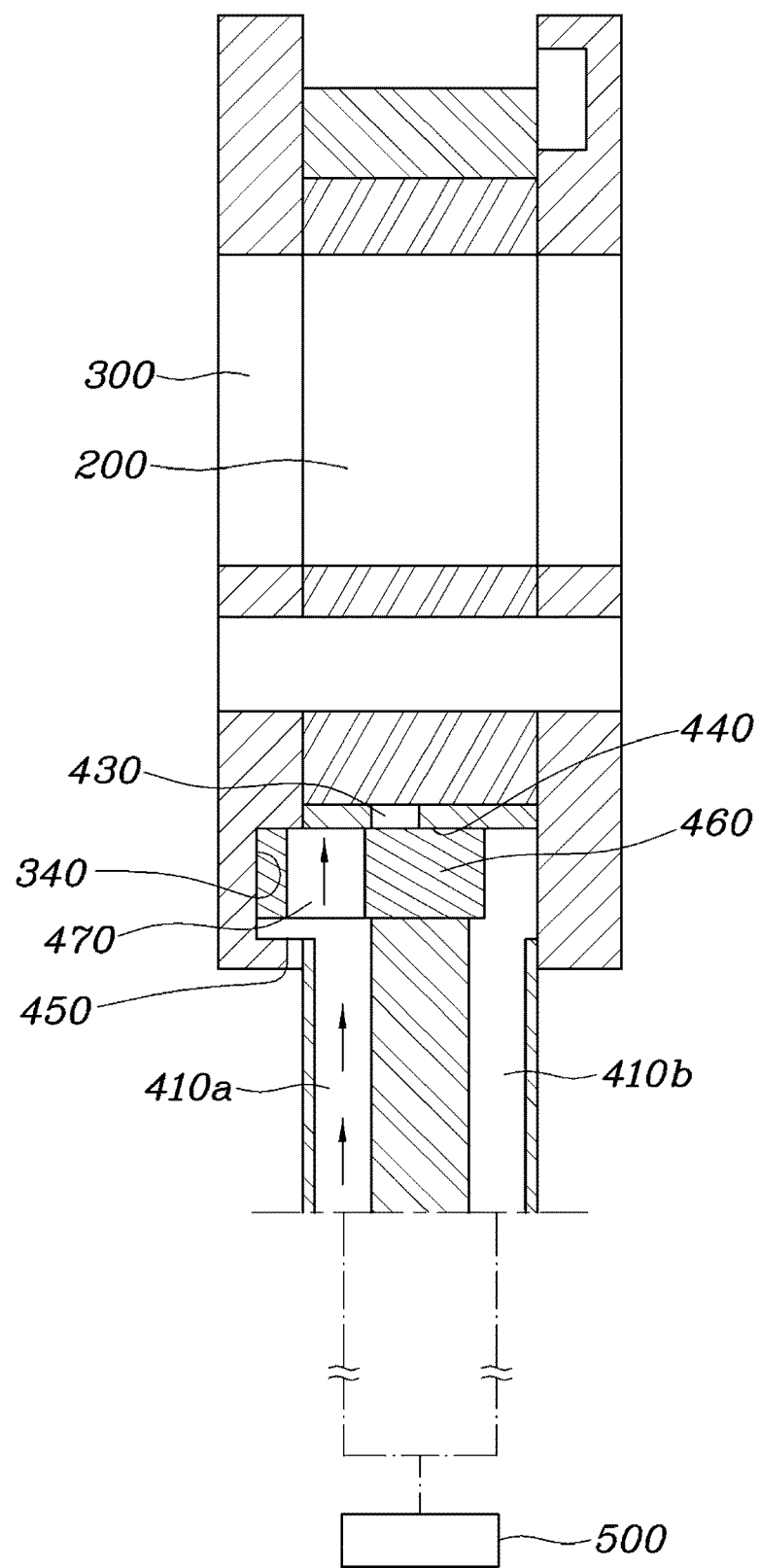
FIG. 7A, FIG. 7B, FIG. 7C, FIG. 7D, and FIG. 7E are views for explaining the configuration of various exemplary embodiments of the latching mechanism and the latching operation procedure thereof according to an exemplary embodiment of the present invention.
Figure 7B:
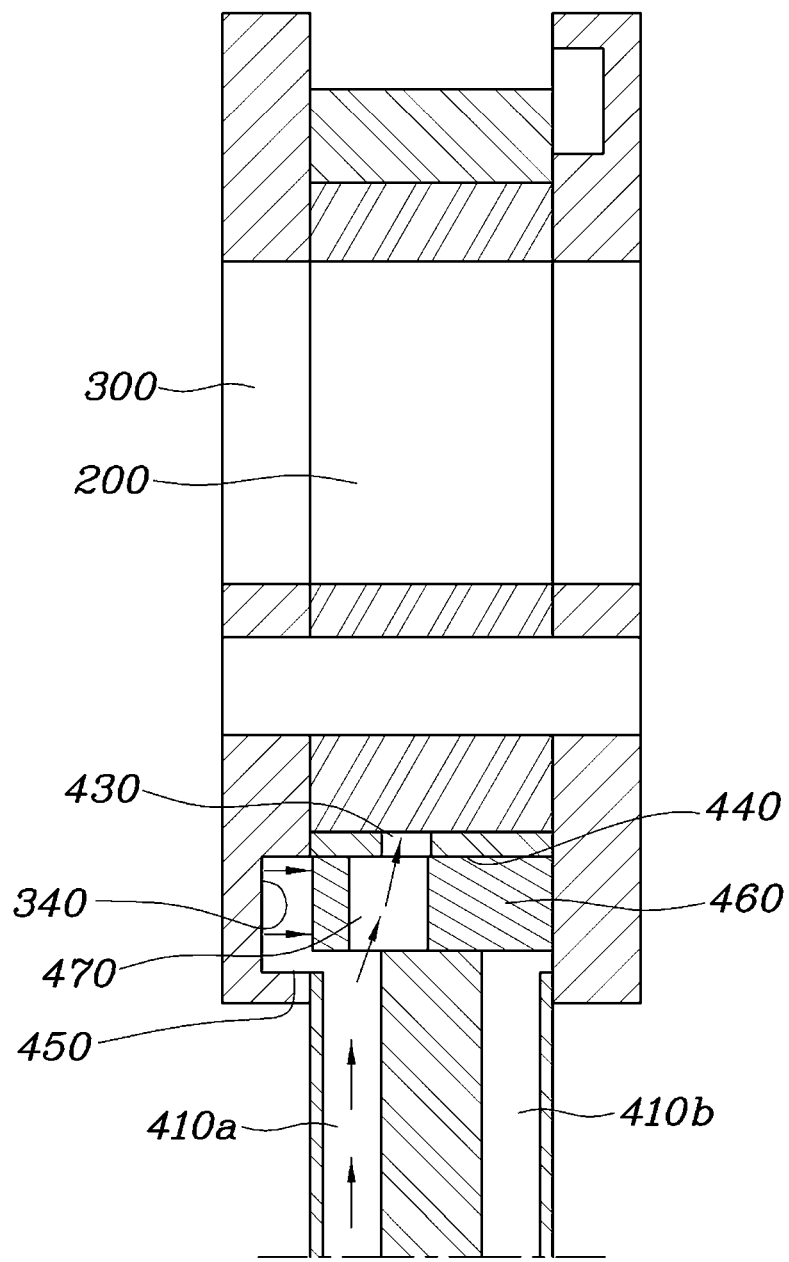

Accordingly, when the latching pin 460 is moved to the right side, as illustrated in FIG. 7B, the latching pin 460 is separated from the latching recess 340 in the left latching plate 300. Thus, the latching pin 460 no longer restrains the latching plate 300.

Figure 7C:
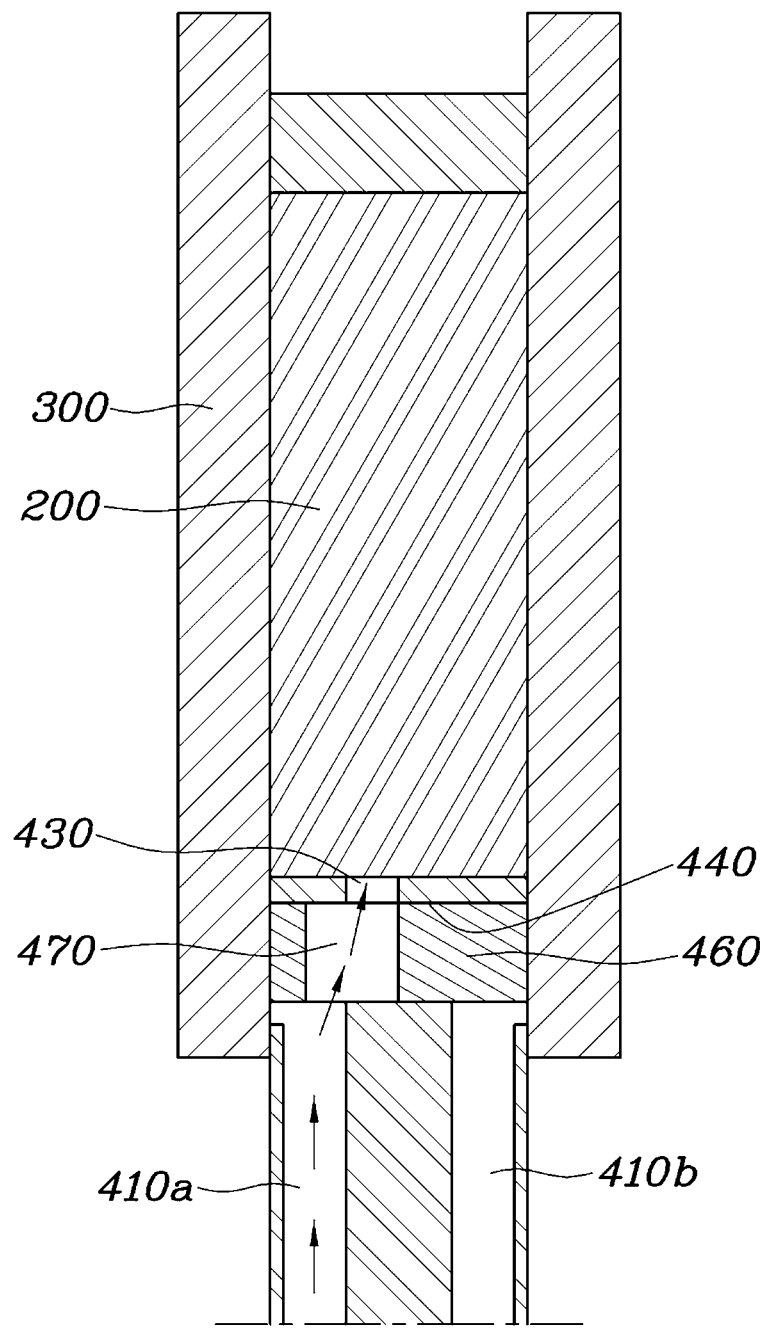

As a result, as illustrated in FIG. 7C, since the oil passage hole 470 formed in the latching pin 460 is changed to the state in which it communicates with the oil hole 430, the oil supplied to the latching cylinder 440 through the first oil line 410a is introduced into the oil hole 430 through the oil passage hole 470. The oil introduced into the oil hole 430 passes through the oil transfer passage 210 formed in the eccentric cam 200, as illustrated in FIG. 5, being introduced into the oil ejection passage 320 in the latching plate 300. As such, when the oil introduced into the oil ejection passage 320 is ejected through the oil ejection hole 330, the latching plate 300 may be rotated by the ejection pressure of the oil.

Figure 7D:
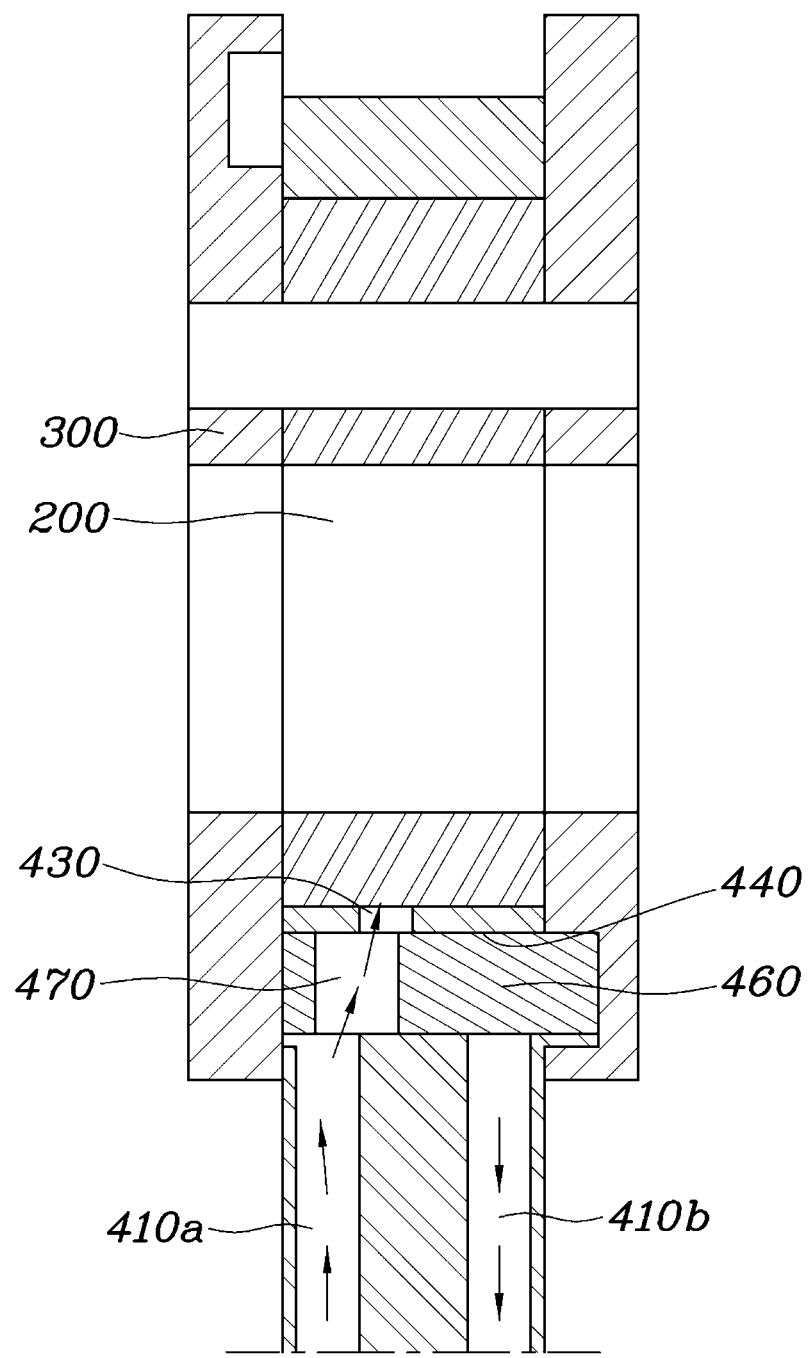

When the latching recess 340 formed in the right latching plate 300 is moved to match the right end portion of the latching cylinder 440 while the latching plate 300 rotates, as illustrated in FIG. 7D, the force that pushes the latching pin 460 to the right side is applied by the pressure of the oil supplied through the first oil line 410a. Accordingly, as illustrated in FIG. 7E, a latching operation in which the latching pin 460 is inserted into the latching recess 340 in the right latching plate 300 to limit the rotation of the latching plate 300 may be implemented.

Figure 7E:
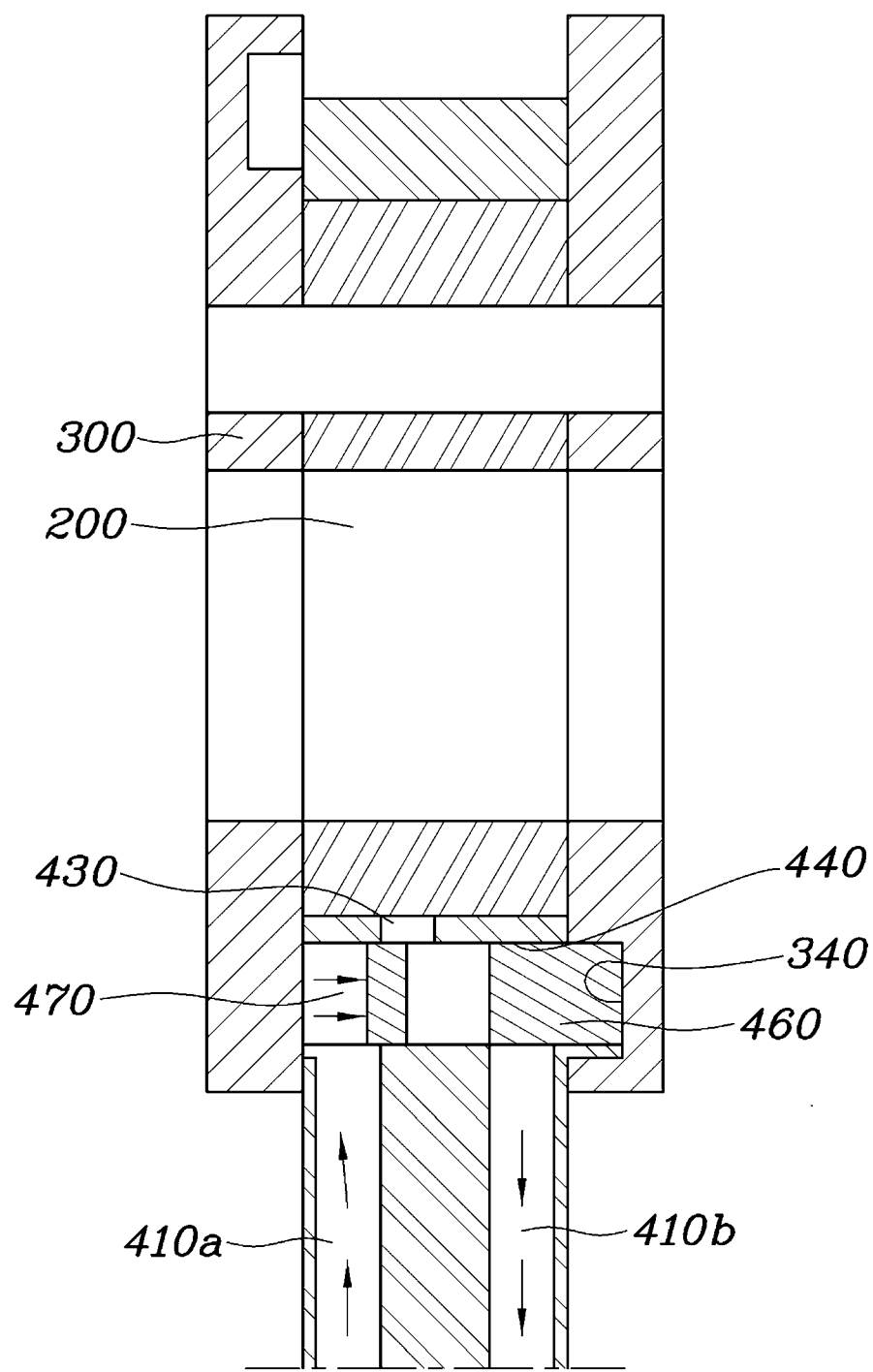

That is, FIG. 7E illustrates the state in which the piston pin 110 is eccentrically rotated by the rotation of the eccentric cam 200, which rotates together with the latching plate 300, so that the piston 100 is moved downwards together with the piston pin 110. Accordingly, the height of the top dead point of the piston 100 is lowered. In the instant state, the latching mechanism enables switching to the state in which a low compression ratio is realized, as illustrated n FIG. 8A.

In the case in which the latching mechanism is used to realize switching from a low compression ratio to a high compression ratio, such a compression-ratio-switching operation is implemented by releasing the latching pin 460 from the right latching plate 300 and inserting the latching pin 460 into the left latching plate 300 using the pressure of the oil supplied through the second oil line 410b.

This is realized by the same operating principle as the operation of moving the latching pin 460 from the left side to the right side as described above, and thus a description thereof will be omitted.

As described above, in an exemplary embodiment of the present invention, when it is required to change a compression ratio, by ejecting oil through the oil ejection hole 330 formed in the external peripheral surface of the latching plate 300, the pressure of the ejected oil provides torque to the latching plate 300 to cause the eccentric cam 200 to be rotated with the latching plate 300. Accordingly, when the piston pin 110, which is provided eccentrically to the eccentric cam 200, is eccentrically rotated about the axis of the eccentric cam 200, the piston 100 moves along the eccentric rotation trace of the piston pin 110, whereby the height of the top dead point of the piston 100 varies, which enables variation in the compression ratio.

Accordingly, the rotation structure of the eccentric cam 200 for eccentric rotation of the piston pin 110 may be simplified, which may simplify a variable-compression-ratio mechanism and may reduce device design costs.

As is apparent from the above description, according to an exemplary embodiment of the present invention, the pressure of oil ejected from a latching plate provides torque to the latching plate to cause an eccentric cam to be rotated with the latching plate, and a piston pin, which is provided eccentrically to the eccentric cam, is eccentrically rotated and causes movement of a piston to vary the height of the top dead point of the piston, which enables variation in the compression ratio. Accordingly, by simplifying the rotational structure of the eccentric cam for eccentric rotation of the piston pin, it is possible to simplify a variable-compression-ratio mechanism and to reduce device design costs.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable-compression-ratio engine comprising:
    a piston pin configured to interconnect a piston and an end portion of a connecting rod;
    an eccentric cam coupled to the piston pin and rotatably provided around the end portion of the connecting rod wherein the piston pin is provided eccentrically to the eccentric cam and the eccentric cam eccentrically rotates the piston pin via rotation thereof to vary a height of a top dead point of the piston;
    a latching plate engaged with the piston pin and the eccentric cam and configured to eject an oil, supplied thereinto, outwards in a circumferential direction thereof through an oil ejection hole formed in an external peripheral surface of the latching plate, to be rotated by an ejection pressure of the oil, the latching plate being selectively rotated with the eccentric cam; and
    an oil supply device connected to the latching plate and configured to selectively supply the oil into the latching plate.

2. The engine according to claim 1, wherein the latching plate includes:
    an oil inlet formed in a surface thereof so that the oil supplied through the oil supply device is introduced into the latching plate; and
    an oil ejection passage formed in the latching plate to fluidically-communicate with the oil inlet,
    wherein the oil ejection passage is connected to the oil ejection hole, which is formed in the external peripheral surface of the latching plate, so that the oil is ejected through the oil ejection hole when the oil is supplied to the oil ejection passage, and the oil ejection hole is formed in the external peripheral surface of the latching plate to open obliquely along the circumferential direction of the latching plate.

3. The engine according to claim 2, wherein the oil ejection passage includes:
    a first ejection passage formed in the latching plate in a circumferential direction of the piston pin;
    a second ejection passage including a first end portion fluidically-communicating with the first ejection passage and a second end portion formed in a radial direction of the latching plate; and
    a third ejection passage including a first end portion bent to fluidically-communicate with the second end portion of the second ejection passage and a second end portion connected to the oil ejection hole.

4. The engine according to claim 3, wherein the third ejection passage is bent relative to the second ejection passage at an angle between 90° and 180°.

5. The engine according to claim 1, wherein the oil supply device includes:

an oil line formed in the connecting rod along a longitudinal direction of the connecting rod so that the oil is supplied therethrough;

a latching mechanism fluidically-connected to the oil line and configured to switch the latching plate between a rotation state and a rotation-restricted state using a pressure of the oil introduced through the oil line;

an oil transfer passage formed in the eccentric cam along a circumferential direction of the eccentric cam so that the oil having passed through the latching mechanism, is supplied into the eccentric cam through the oil transfer passage; and an oil outlet formed in the eccentric cam and fluidically-connected to the oil transfer passage and an oil inlet formed in the latching plate so that the oil inside the oil transfer passage is introduced into the latching plate through the oil outlet.

6. The engine according to claim 5, wherein the connecting rod includes:

a cam hole formed in the end portion of the connecting rod, wherein the eccentric cam is inserted into the cam hole; and an oil hole formed in the connecting rod between the oil line of the latching mechanism and an internal peripheral surface of the cam hole so that the oil having passed through the latching mechanism, flows through the oil hole, wherein the oil transfer passage includes a first transfer passage and a second transfer passage, wherein the first transfer passage is formed in the circumferential direction of the eccentric cam to continue in fluidical-communication with the oil hole, which is connected to the cam hole, and wherein the second transfer passage fluidically-communicates with an end portion of the first transfer passage, and fluidically-communicates with the oil inlet in the latching plate.

7. The engine according to claim 6, wherein the second transfer passage is formed in the eccentric cam along an axial direction of the eccentric cam.

8. The engine according to claim 5, wherein the latching mechanism includes:

a latching recess formed in a surface of the latching plate that faces the end portion of the connecting rod, the latching plate being coupled to either side of the eccentric cam;

a latching cylinder formed in the end portion of the connecting rod and including an end portion located to match the latching recess during rotation of the latching plate, the latching cylinder being connected to an upper end portion of the oil line so that the oil is selectively supplied into the latching cylinder;

an oil groove formed in the upper end portion of the oil line to extend towards the latching recess and positioned to fluidically-communicate with the latching recess and the oil line during rotation of the latching plate;

a latching pin provided in the latching cylinder to be selectively movable towards the latching plate by the oil received from the oil supply device so that an end portion of the latching pin is fitted into the latching recess to implement a latching operation; and an oil passage hole formed in the latching pin so that the oil supplied through the oil line is supplied in the oil passage hole, wherein the oil hole is formed between the latching cylinder and the oil transfer passage of the eccentric cam and connected to the oil transfer passage to selectively supply the oil having passed through the oil passage hole, to the oil transfer passage according to a movement of the latching pin.

9. The engine according to claim 8, wherein the oil supplied through the oil line passes through the oil passage hole to the oil hole during an unlatching operation period during which the latching pin is not caught by the latching recess.

10. The engine according to claim 8, wherein the oil line is connected to a side of the latching cylinder, and wherein the latching mechanism further includes a latching elastic member configured to provide an elastic force that continuously pushes the latching pin to the side of the latching cylinder.

11. The engine according to claim 10, wherein the latching pin includes a first stepped portion and a second stepped portion having different external diameters therebetween, and wherein the latching elastic member is supported between the first stepped portion and the second stepped portion in the latching cylinder.

12. The engine according to claim 8, wherein the oil line includes a first oil line and a second oil line, which are selectively connectable to either side of the latching cylinder, and wherein the oil supply device includes an electric oil pump and the oil is supplied to the oil line via the electric oil pump.

* * * * *